US012658114B2

(12) United States Patent
Park et al.

(10) Patent No.: US 12,658,114 B2
(45) Date of Patent: Jun. 16, 2026

(54) PIXEL AND DISPLAY DEVICE INCLUDING THE SAME

(71) Applicant: Samsung Display Co., LTD., Yongin-si (KR)

(72) Inventors: Kyeong Min Park, Yongin-si (KR); Kyung Bae Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/961,471

(22) Filed: Nov. 27, 2024

(65) Prior Publication Data

US 2025/0273130 A1 Aug. 28, 2025

(30) Foreign Application Priority Data

Feb. 22, 2024 (KR) ........................ 10-2024-0025826

(51) Int. Cl.
*G09G 3/3233* (2016.01)
*G09G 3/32* (2016.01)

(52) U.S. Cl.
CPC ............. *G09G 3/32* (2013.01); *G09G 3/3233* (2013.01); *G09G 2300/0842* (2013.01); *G09G 2310/08* (2013.01); *G09G 2320/0233* (2013.01)

(58) Field of Classification Search
CPC ................... G09G 3/32; G09G 3/3233; G09G 2300/0842; G09G 2310/08; G09G 2320/0233
See application file for complete search history.

(56) References Cited

U.S. PATENT DOCUMENTS

| | | | |
|---|---|---|---|
| 9,984,616 B2 | 5/2018 | Wacyk | |
| 2012/0313118 A1 | 12/2012 | Wacyk et al. | |
| 2017/0061876 A1* | 3/2017 | Cho | G09G 3/3233 |

OTHER PUBLICATIONS

Behzad Razavi, "Design of Analog CMOS Integrated Circuits", McGraw-Hill, 2017, 801 pages.
Kei Kimura et al., "New pixel driving circuit using self-discharging compensation method for high-resolution OLED micro displays on a silicon backplane", Journal of the SID, Apr. 18, 2017, pp. 167-176, vol. 25, Issue3.
Bong-Choon Kwak, "Design of 2000 ppi OLED-on-Silicon Pixel Structure for Microdisplays" Graduate School of Hanyang University, M.S. Thesis, Feb. 2010.

* cited by examiner

*Primary Examiner* — Julie Anne Watko
(74) *Attorney, Agent, or Firm* — CANTOR COLBURN LLP

(57) ABSTRACT

A pixel for a display device includes: a first transistor with a gate electrode connected to a first node, the first transistor being between a second node and a third node; a second transistor between the second node and a first power line; a third transistor between a data line and the first node; a fourth transistor between a fourth node and the first node; a fifth transistor between the first power line and the fourth node; a sixth transistor between the third node and a third power line; a first capacitor between the first node and the third transistor; and a light emitting element between the third node and a second power line. During a first period of a horizontal cycle, the third, fourth, fifth, and sixth transistors are turned on. The pixel circuit compensates for threshold voltage variation and enables a wide data voltage range, improving display efficiency and grayscale implementation.

17 Claims, 14 Drawing Sheets

SL1: SL11, SL12, ..., SL1n
SL2: SL21, SL22, ..., SL2n
SL3: SL31, SL32, ..., SL3n
EL: EL1, EL2, ...,ELn

PIXEL AND DISPLAY DEVICE INCLUDING THE SAME

This application claims priority to Korean patent application No. 10-2024-0025826, filed on Feb. 22, 2024, and all the benefits accruing therefrom under 35 U.S.C. § 119, the content of which in its entirety is herein incorporated by reference.

BACKGROUND

1. Technical Field

The present disclosure generally relates to a pixel and a display device including the same.

2. Related Art

With the development of multimedia, the importance of display devices has increased. Accordingly, various types of display devices such as an Organic Light Emitting Display ("OLED") and a Liquid Crystal Display ("LCD") are used.

Recently, a Head Mounted Display Device ("HMD") has been developed. The HMD is a display device which a user wears in the form of glasses or a helmet, thereby implementing Virtual Reality ("VR") or Augmented Reality ("AR"), in which a focus is formed at a distance close to eyes. A high resolution panel is applied to the HMD, and accordingly, a pixel applicable to the high resolution panel is desirable.

The above information disclosed in this Related Art section is only for enhancement of understanding of the background of the disclosure and therefore it may contain information that does not form the prior art that is already known in this country to a person of ordinary skill in the art.

SUMMARY

Embodiments provide a pixel having improved efficiency and a display device including the pixel.

In accordance with an aspect of the present disclosure, there is provided a pixel including: a first transistor having a gate electrode connected to a first node, the first transistor being connected between a second node and a third node; a second transistor connected between the second node and a first power line to which a first driving power source is supplied, the second transistor having a gate electrode connected to the second node; a third transistor connected between a data line and the first node, the third transistor having a gate electrode electrically connected to a first scan line; a first capacitor connected between the first node and the third transistor; and a light emitting element connected between the third node and a second power line to which a second driving power source is supplied.

The pixel may further include: a fourth transistor connected between a fourth node and the first node, the fourth transistor having a gate electrode electrically connected to a second scan line; and a fifth transistor connected between the first power line and the fourth node, the fifth transistor having a gate electrode electrically connected to an emission control line. The second transistor may be connected between the fourth node and the second node.

The pixel may further include a sixth transistor connected between the third node and a third power line, the sixth transistor having a gate electrode electrically connected to a third scan line.

Each of the first transistor, the third transistor, and the sixth transistor may have a first breakdown voltage, and at least one of the second transistor, the fourth transistor, or the fifth transistor may have a second breakdown voltage. The second breakdown voltage may be lower than the first breakdown voltage.

One horizontal period may include a first period, a second period, and a third period, which are sequentially defined. In the first period, the third to sixth transistors may be turned on.

In the second period, the fourth and fifth transistors may be turned off, and the third and sixth transistors may be continuously turned on.

In the second period, a data voltage supplied to the data line may be transferred to the first capacitor and the gate electrode of the first transistor through the turned-on third transistor.

In the third period, the third transistor, the fourth transistor, and the sixth transistor may be turned off, and the fifth transistor may be turned on.

In the third period, a driving current may be supplied to the light emitting element from the first power line through the fifth transistor, the second transistor, and the first transistor according to a voltage of the gate electrode of the first transistor.

Each of the first to sixth transistors may be a P-type transistor.

The pixel may further include a second capacitor connected between the first node and the second node.

The second transistor may function as a diode such that a current flows from the first power line to the second node.

The pixel may further include: a fourth transistor connected between the second node and the first node, the fourth transistor having a gate electrode connected to a second scan line; and a fifth transistor connected between the first power line and the second transistor, the fifth transistor having a gate electrode electrically connected to an emission control line. The second transistor may be connected between the fifth transistor and the second node.

The pixel may further include a sixth transistor connected between the third node and a third power line, the sixth transistor having a gate electrode electrically connected to a third scan line. Each of the first transistor, the third transistor, and the sixth transistor may have a first breakdown voltage, and at least one of the second transistor, the fourth transistor, or the fifth transistor may have a second breakdown voltage. The second breakdown voltage may be lower than the first breakdown voltage.

In accordance with another aspect of the present disclosure, there is provided a display device including pixels connected first scan lines, second scan lines, third scan lines, data lines, and emission control lines, where any one pixel among the pixels includes: a first transistor having a gate electrode connected to a first node, the first transistor being connected between a second node and a third node; a second transistor connected between the second node and a first power line to which a first driving power source is supplied, the second transistor having a gate electrode connected to the second node; a third transistor connected between the first node and one of the data lines, the third transistor having a gate electrode electrically connected to one of the first scan lines; a first capacitor connected between the first node and the third transistor; and a light emitting element connected between the third node and a second power line to which a second driving power source is supplied.

The display device may further include: a fourth transistor connected between a fourth node and the first node, the fourth transistor having a gate electrode electrically connected to one of the second scan lines; and a fifth transistor connected between the first power line and the fourth node, the fifth transistor having a gate electrode electrically connected to one of the emission control lines. The second transistor may be connected between the fourth node and the second node.

The display device may further include a fourth transistor connected between the second node and the first node, the fourth transistor having a gate electrode connected to one of the second scan lines; and a fifth transistor connected between the first power line and the fourth node, the fifth transistor having a gate electrode electrically connected to one of the emission control lines. The second transistor may be connected between the fourth node and the second node.

The display device may further include a sixth transistor connected between the third node and a third power line, the sixth transistor having a gate electrode electrically connected to one of the third scan lines.

Each of the first transistor, a third transistor, and the sixth transistor may have a first breakdown voltage, and at least one of the second transistor, the fourth transistor, or the fifth transistor may have a second breakdown voltage. The second breakdown voltage may be lower than the first breakdown voltage.

The display device may further include a second capacitor connected between the first node and the second node.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
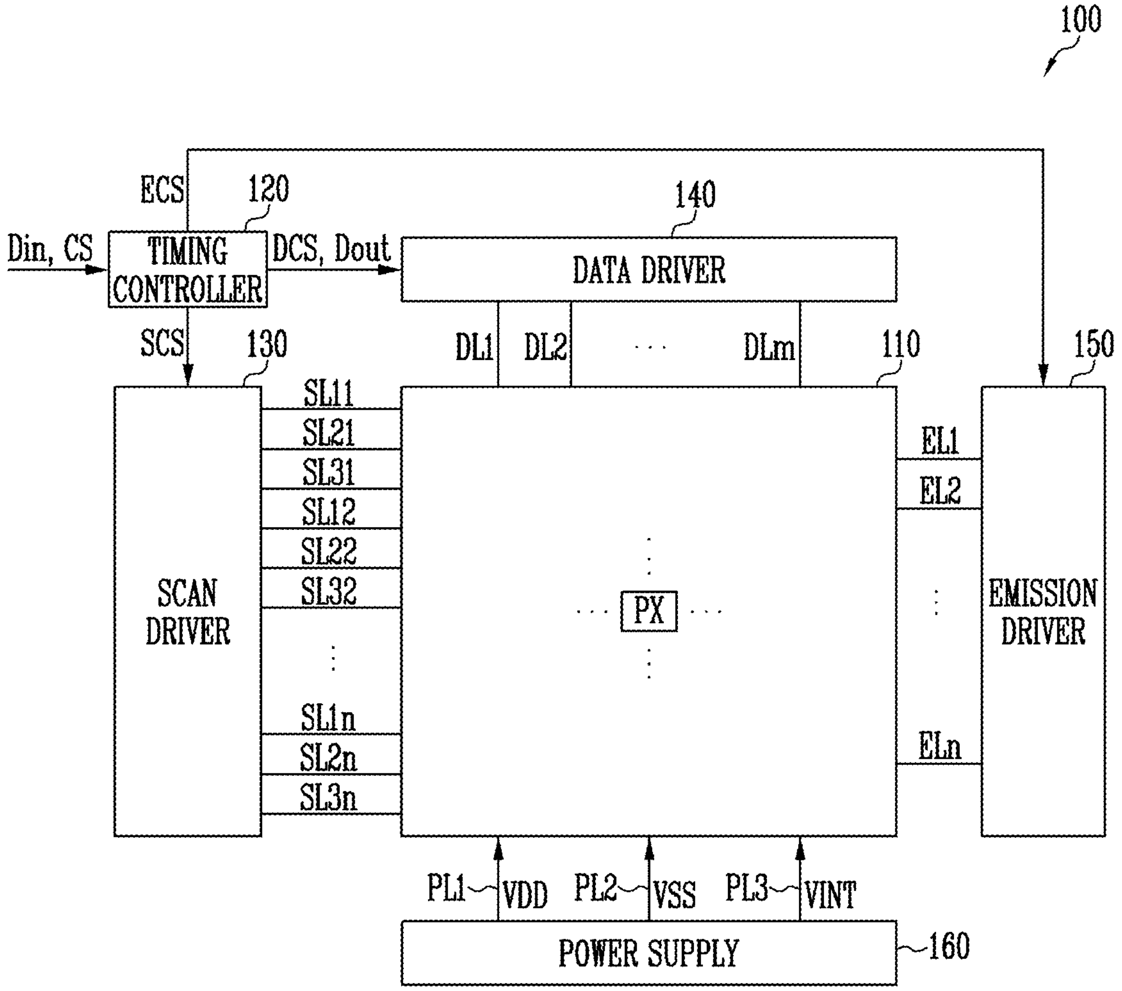
FIG. 1 is a block diagram of a display device in accordance with an embodiment of the present disclosure.

Hereinafter, embodiments of the present disclosure will be described in more detail with reference to the accompanying drawings. In the description below, only a necessary part to understand an operation according to the present disclosure is described and the descriptions of other parts are omitted in order not to unnecessarily obscure subject matters of the present disclosure. In addition, the present disclosure is not limited to exemplary embodiments described herein, but may be embodied in various different forms. Rather, exemplary embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it can be directly connected or coupled to the another element or be indirectly connected or coupled to the another element with one or more intervening elements interposed therebetween. The technical terms used herein are used only for the purpose of illustrating a specific embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, or Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

In addition, the embodiments of the disclosure are described here with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the disclosure.

FIG. 1 is a block diagram of a display device in accordance with an embodiment of the present disclosure.

Referring to FIG. 1, the display device 100 in accordance with the embodiment of the present disclosure may include a display panel 110, a timing controller 120, a scan driver 130, a data driver 140, an emission driver 150, and a power supply 160. The above-described components may be implemented as separate integrated circuits, and two or more components among the above-described components may be implemented to be integrated into one integrated circuit. In an embodiment, for example, the scan driver 130 and the emission driver 150 may be formed to be included in the display panel 110.

The display panel 110 may include pixels PX connected to first scan lines SL11 to SL1*n*, second scan lines SL21 to SL2*n*, third scan lines SL31 to SL3*n*, data lines DL1 to DLm, emission control lines EL1 to ELn, and power lines PL1 to PL3 (n and m are integers of 0 or more).

In some embodiments, a pixel PXij (see FIG. 3) located on an ith horizontal line (or pixel row) and a jth vertical line (or pixel column) may be connected to an ith first scan line SL1*i*, an ith second scan line SL2*i*, an ith third scan line SL3*i*, an ith emission control line ELi, and a jth data line DLj (i is an integer of n or less, and j is an integer of m or less).

Pixels PX may be selected in units of horizontal lines when a first scan signal is supplied to the first scan lines SL11 to SL1*n*. Each of the pixels PX selected by the first scan signal may be supplied with a data signal from a data line (any one of DL1 to DLm) connected thereto. The pixel PX supplied with the data signal may generate light with a predetermined luminance, corresponding to a voltage of the data signal.

The scan driver 130 may receive a scan driving signal SCS from the timing controller 120. At least one scan start signal and at least one clock signal, which are for driving of the scan driver 130, may be included in the scan driving signal SCS. The scan driver 130 may generate the first scan signal, a scan signal, and a third scan signal while shifting the scan start signal, corresponding to the clock signal.

The data driver 140 may receive output data Dout and a data driving signal DCS from the timing controller 120. The data driving signal DCS may include a sampling signal and/or timing signals for driving of the data driver 140. The data driver 140 may generate a data signal, based on the data driving signal DCS and the output data Dout. In an example, the data driver 140 may generate an analog data signal, based on a grayscale of the output data Dout. The data driver 140 may sequentially supply a voltage of a reference power source and a voltage of the data signal to the data lines DL1 to DLm during a horizontal period 1H (see FIG. 4).

The emission driver 150 may receive an emission driving signal ECS from the timing controller 120. An emission start signal and clock signals, which are for driving the emission driver 150, may be included in the emission driving signal ECS. The emission driver 150 may generate an emission control signal while shifting the emission start signal, corresponding to the clock signal.

The timing controller 120 may receive input data Din and a control signal CS from a host system through an interface. In an example, the timing controller 120 may receive the input data Din and the control signal CS from at least one of a Graphics Processing Unit ("GPU"), a Central Processing Unit ("CPU"), or an Application Processor ("AP"), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140.

The power supply 160 may generate various power sources for driving of the display device 100. In an example, the power supply 160 may generate a first driving power source VDD, a second driving power source VSS, and an initialization power source VINT.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX are set to be in an emission state.

The initialization power source VINT may be a voltage for initializing a first electrode (or anode electrode) of a light emitting element LD (see FIG. 3) included in each of the pixels PX. The initialization power source VINT may have a voltage value at which the light emitting element LD is turned on when the initialization power source VINT is supplied to the first electrode of the light emitting element LD. In an embodiment, for example, the initialization power source VINT may be set to a ground potential.

The first driving power source VDD, the second driving power source VSS, and the initialization power source VINT, which are generated by the power supply 160, may be supplied to a first power line PL1, a second power line PL2, and a third power line PL3, respectively. The first power line PL1, the second power line PL2, and the third power line PL3 may be commonly connected to the pixels PX, but the embodiment of the present disclosure is not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX. That is, in an embodiment of the present disclosure, each of the pixels PX may be connected to any one of the plurality of power lines of the first power line PL1, any one of the plurality of power lines of the second power line PL2, and any one of the plurality of power lines of the third power line PL3.

Figure 2:
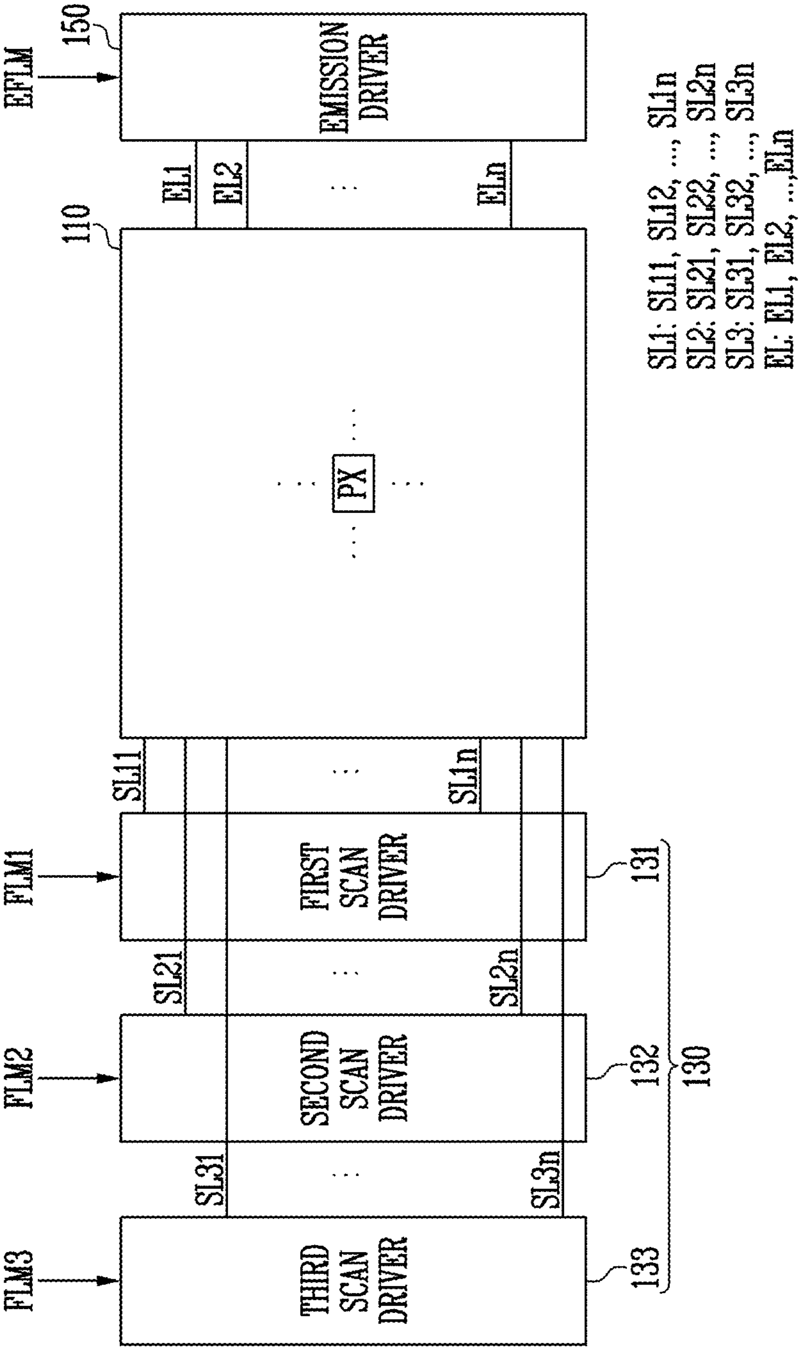
FIG. 2 is a block diagram illustrating an embodiment of a scan driver and an emission driver, which are shown in FIG. 1.

FIG. 2 is a block diagram illustrating an embodiment of the scan driver and the emission driver, which are shown in FIG. 1.

Referring to FIG. 2, the scan driver 130 may include a first scan driver 131, the second scan driver 132, and a third scan driver 133.

The first scan driver 131 may receive a first scan start signal FLM1, and generate the first scan signal while shifting the first scan start signal FLM1, corresponding to the clock signal. The first scan driver 131 may sequentially supply the first scan signal to the first scan lines SL11 to SL1*n*.

The second scan driver 132 may receive a second scan start signal FLM2, and generate the second scan signal while shifting the second scan start signal FLM2, corresponding to the clock signal. The second scan driver 132 may sequentially supply the second scan signal to the second scan lines SL21 to SL2*n*.

The third scan driver 133 may receive a third scan start signal FLM3, and generate the third scan signal while shifting the third scan start signal FLM3, corresponding to the clock signal. The third scan driver 133 may sequentially supply the third scan signal to the third scan lines SL31 to SL3*n*.

Each of the first scan signal, the second scan signal, and the third scan signal may be set to a gate-on voltage such that transistors included in the pixels PX can be turned on.

In an example, the first to third scan signals having a low level may be supplied as the gate-on voltages to a P-type transistor. The first to third scan signals having a high level may be supplied as the gate-on voltages to an N-type transistor. A transistor supplied with the first scan signal, the second scan signal, or the third scan signal may be turned on corresponding to the first scan signal, the second scan signal, or the third scan signal.

After that, that the first scan signal, the second scan signal, or the third scan signal is supplied may mean that the gate-on voltage is supplied to the first scan lines SL11 to SL1*n*, the second scan lines SL21 to SL2*n*, or third scan lines SL31 to SL3*n*. In addition, that the first scan signal, the second scan signal, or the third scan signal is not supplied may mean that a gate-off voltage is supplied to the first scan lines SL11 to SL1*n*, the second scan lines SL21 to SL2*n*, or third scan lines SL31 to SL3*n*.

In FIG. 2, it is illustrated that the first scan driver 131, the second scan driver 132, and the third scan driver 133 are connected to the first scan lines SL11 to SL1*n*, the second scan lines SL21 to SL2*n*, and the third scan lines SL31 to SL3*n*, respectively. However, the present disclosure is not limited thereto. For another example, at least two scan lines among the first scan lines SL11 to SL1*n*, the second scan lines SL21 to SL2*n*, and the third scan lines SL31 to SL3*n* may be driven by one scan driver.

The emission driver 150 may receive an emission start signal EFLM, and generate the emission control signal while shifting the emission start signal EFLM, corresponding to the clock signal. The emission driver 150 may sequentially supply the emission control signal to the emission control lines EL1 to ELn. The emission control signal may be set to the gate-on voltage such that the transistors included in the pixels PX can be turned on.

In an example, the emission control signal having the low level may be supplied as the gate-on voltage to the P-type transistor, and the emission control signal having the high level may be supplied as the gate-on voltage to the N-type transistor. A transistor supplied with the emission control signal may be turned on corresponding to the emission control signal. After that, that the emission control signal is supplied may mean that the gate-on voltage is supplied to the emission control lines EL1 to EL2. In addition, that the emission control signal is not supplied may mean that the gate-off voltage is supplied to the emission control lines EL1 to ELn.

Figure 3:
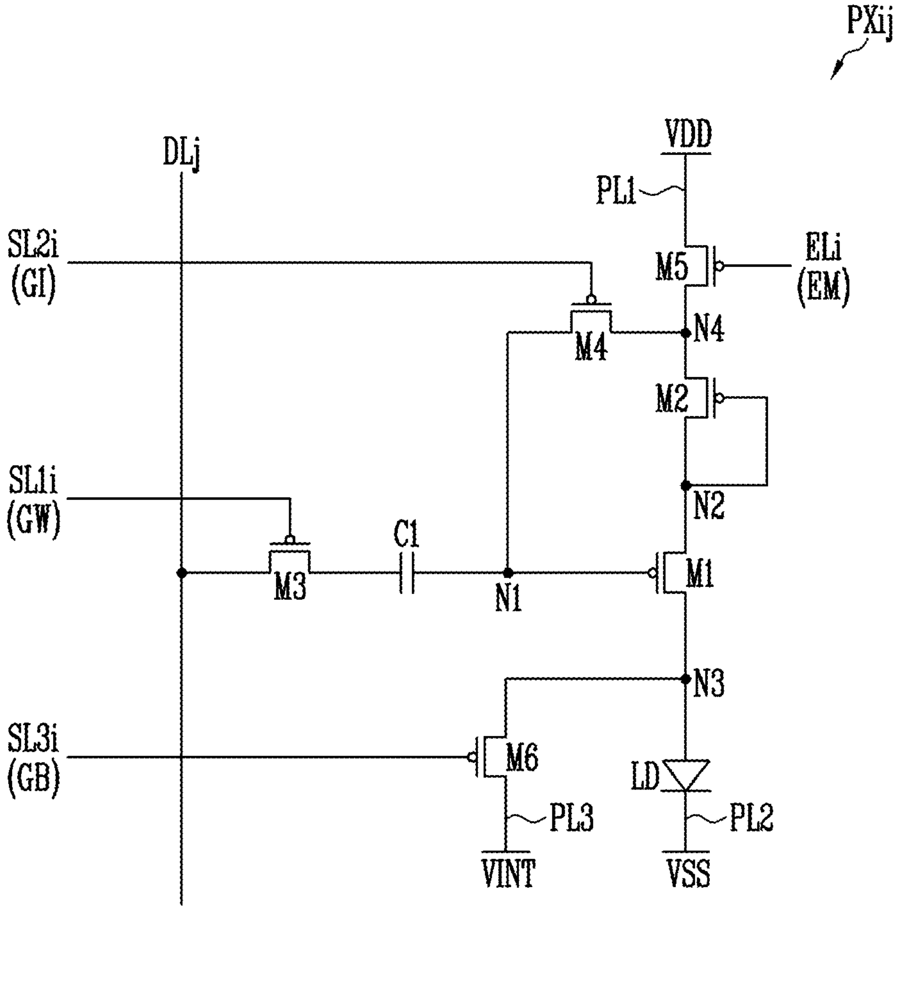
FIG. 3 is a circuit diagram illustrating an embodiment of any one of pixels shown in FIG. 1.

FIG. 3 is a circuit diagram illustrating an embodiment of any one of the pixels shown in FIG. 1. In FIG. 3, a pixel PXij located on an ith horizontal line and a jth vertical line is exemplarily illustrated.

Referring to FIG. 3, the pixel PXij in accordance with the embodiment of the present disclosure may be connected to corresponding signal lines SL1*i*, SL2*i*, SL3*i*, ELi, and DLj. In an embodiment, for example, the pixel PXij may be connected to an ith first scan line SL1*i*, an ith second scan line SL2*i*, an ith third scan line SL3*i*, an ith emission control line ELi, and a jth data line DLj. In an embodiment, the pixel PXij may be further connected to the first power line PL1, the second power line PL2, and the third power line PL3.

The pixel PXij may include a light emitting element LD and a pixel circuit for controlling an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a third node N3, a first transistor M1, a second node N2, a second transistor M2, a fourth node N4, and a fifth transistor M5. A second electrode (or cathode electrode) of the light emitting element LD may be electrically connected to the second power line PL2. The light emitting element LD may generate light with a predetermined luminance, corresponding to an amount of current supplied from the first power line PL1 to the second power line PL2 via the pixel circuit.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 3, it is illustrated that the pixel PXij includes a single light emitting element LD. However, the present disclosure is not limited thereto. For another example, the pixel PXij may include a plurality of light emitting elements LD, and the plurality of light emitting elements LD may be connected in series, parallel or series/parallel to each other.

The pixel circuit may include the first transistor M1, the second transistor M2, a third transistor M3, a fourth transistor M4, the fifth transistor M5, a sixth transistor M6, and a first capacitor C1.

Each of the first to sixth transistors M1 to M6 may be a P-type transistor. Each of the first to sixth transistors M1 to M6 may be a Metal Oxide Silicon Field Effect Transistor ("MOSFET"). In an embodiment, for example, when the first transistor M1 is a P-type MOSFET, the light emitting element LD may be connected to a second electrode (or drain electrode) of the first transistor M1, so that the pixel circuit is little influenced by degradation of the light emitting element LD. However, this is merely illustrative, and the present disclosure is not limited thereto. For another example, at least one of the first to sixth transistors M1 to M6 may be replaced with an N-type transistor.

In embodiments, the first to sixth transistors M1 to M6 may include an amorphous silicon semiconductor, a monocrystalline silicon semiconductor, a polycrystalline silicon semiconductor, an oxide semiconductor, and/or the like.

The first transistor M1 (or driving transistor) may be connected between the second node N2 and the third node N3 (i.e., the first electrode of the light emitting element LD). The term "being connected" may include a meaning of "being electrically connected." A first electrode (or source electrode) of the first transistor M1 may be electrically connected to the second node N2, and a second electrode (or drain electrode) of the first transistor M1 may be connected to the third node N3. A gate electrode of the first transistor M1 may be connected to a first node N1. The first transistor M1 may be turned on according to a voltage level of the first node N1.

The second transistor M2 may be connected between the fourth node N4 and the second node N2. A gate electrode of the second transistor M2 may be electrically connected to the second node N2. The second transistor M2 may function as a diode such that a current flows from the first power line PL1 to the second node N2 through the fifth transistor M5. In an embodiment, for example, the second transistor M2 may be connected such that the current can flow from the fourth node N4 to the second node N2.

As such, the second transistor M2 is connected to the first electrode of the first transistor M1, so that a portion of a voltage of the gate electrode of the first transistor M1 can be applied to opposite ends of a load of the first transistor M1. Accordingly, an equivalent transconductance Gm of the first transistor M1 can be less influenced by an intrinsic transconductance gm. The equivalent transconductance Gm may be determined as shown in Equation 1.

$$G_m = \frac{\partial I_D}{\partial V_{in}} = \frac{1}{1/g_m + R_{dio}} \approx \frac{1}{R_{dio}}, R_{dio} \gg \frac{1}{g_m} \qquad \text{Equation 1}$$

$V_{in}$ may denote an input voltage of the gate electrode of the first transistor M1, and $I_D$ may denote a drain-source current of the first transistor M1. $R_{dio}$ may denote a resistance of the second transistor M2 serving as a diode.

The intrinsic transconductance gm may be determined by a small-signal analysis as shown in Equation 2, and therefore, a current change with respect to a threshold voltage variation may become more insensitive as $R_{dio}$ becomes larger.

$$g_m = \mu_p C_{ox} \frac{W}{L}(V_{GS} - V_{TH}) \qquad \text{Equation 2}$$

$\mu_p$ may denote an electric field mobility, $C_{ox}$ may denote a capacity of a gate insulating layer per unit area, and W/L may denote a width/length ratio of a channel of the first transistor M1.

As such, the second transistor M2 serving as a diode having a high resistance at an extremely low current is connected to the first electrode of the first transistor M1, so that source degradation of the first transistor M1 can be implemented. The source degradation may mean a phenomenon in which, by a resistance component connected to the first electrode (or source electrode) of the first transistor M1, a relationship between an input voltage (or a gate voltage of the first transistor M1) and an output current (or a current flowing through the first transistor M1 between the second node N2 and the third node N3) is linearized without being influenced by other factors such as degradation. The range of a voltage to be applied to the gate electrode of the first transistor M1 may be relatively widened according to the source degradation, and accordingly, the range of a voltage of a data signal may also be widened.

In an embodiment, for example, a negative feedback action on a threshold voltage variation of the first transistor M1 may be caused through the second transistor M2. The negative feedback action may compensate for a threshold voltage distribution of the first transistor M1. Therefore, the range of the voltage of the data signal may be set sufficiently wide as compared with a case where the second transistor M2 is not provided.

The third transistor M3 may be connected between the jth data line DLj and the first node N1. In addition, a gate electrode of the third transistor M3 may be electrically connected to the ith first scan line SL1*i*. The third transistor M3 may be turned on when a first scan signal GW is supplied to the ith first scan line SL1*i*, to electrically connect the jth data line DLj and the first node N1 to each other.

The fourth transistor M4 may be connected between the first node N1 and the fourth node N4. In addition, a gate electrode of the fourth transistor M4 may be electrically connected to the ith second scan line SL2*i*. The fourth transistor M4 may be turned on when a second scan signal GI is supplied to the ith second scan line SL2*i*, to electrically connect the first node N1 and the fourth node N4 to each other. The gate electrode of the first transistor M1 (i.e., the first node N1) and the first electrode of the first transistor M1 (i.e., the fourth node connected to the second node N2 through the second transistor M2) may be electrically connected to each other. Accordingly, the first transistor M1 may function as a diode according to an operation of the fourth transistor M4.

The fifth transistor M5 may be connected between the first power line PL1 and the fourth node N4. In addition, a gate electrode of the fifth transistor M5 may be electrically connected to the ith emission control line ELi. The fifth transistor M5 may be turned on when an emission control signal EM is supplied to the ith emission control line ELi, and be turned off when the emission control signal EM is not supplied. When the fifth transistor M5 is turned off, the first driving power source VDD and the second transistor M2 may be electrically blocked from each other.

The sixth transistor M6 may be connected between the third node N3 and the third power line PL3. A first electrode of the sixth transistor M6 may be electrically connected to the third node N3 (i.e., the first electrode of the light emitting element LD), and a second electrode of the sixth transistor M6 may be electrically connected to the third power line PL3. In addition, a gate electrode of the sixth transistor M6 may be electrically connected to the ith third scan line SL3*i*. The sixth transistor M6 may be turned on when a third scan signal GB is supplied to the ith third scan line SL3*i*. When the sixth transistor M6 is turned on, a voltage of the initialization power source VINT may be supplied to the third node N3. In embodiments, the voltage of the initialization power source VINT may be supplied by the power supply 160 (see FIG. 1). In other embodiments, the voltage of the initialization power source VINT may be provided by an external device of the display device 100.

In embodiments, each of the first transistor M1, the third transistor M3, and the sixth transistor M6 may be a transistor having a first breakdown voltage with the same level. In an embodiment, for example, the first breakdown voltage may have a relatively high voltage level. On the other hand, at least one of the second transistor M2, the fourth transistor M4, or the fifth transistor M5 may be a transistor having a second breakdown voltage with the same level. The second breakdown voltage may have a level lower than the level of the first breakdown voltage. The "breakdown voltage" may mean a voltage at which a current starts flowing through a transistor even in an off-state due to an excessive off-state voltage caused by an external environment such as an instantaneous short circuit or an electrostatic discharge.

In an example, the operational reliability of each of the first transistor M1, the third transistor M3, and the sixth transistor M6 may be deteriorated when the first breakdown voltage or higher is supplied to each of a gate-source electrode, a gate-drain electrode, and a gate-body electrode. In an embodiment, for example, the first breakdown voltage may be 6V, 8V or 10V. On the other hand, the operational reliability of at least one of the second transistor M4, the fourth transistor M4, or the fifth transistor M5 may be deteriorated when the second breakdown voltage or higher is supplied to each of a gate-source electrode, a gate-drain electrode, and a gate-body electrode. In an embodiment, for example, the second breakdown voltage may be 3.3V or 5V.

As such, a pixel circuit is implemented by combining transistors having the second breakdown voltage lower than the first breakdown voltage with transistors having the first breakdown voltage, so that the first transistor M1 can be designed to have a maximum size within an area of the pixel. Accordingly, the luminance and/or short range uniformity between the pixels PX can be effectively improved. In addition, the second transistor M2 is implemented as a transistor having the second breakdown voltage, so that a driving voltage margin corresponding to a decreased threshold voltage can be secured.

The first capacitor C1 (or coupling capacitor) may be connected between the first node N1 and the third transistor M3. A first electrode of the first capacitor C1 may be electrically connected to a first electrode of the third transistor M3, and a second electrode of the first capacitor C1 may be electrically connected to the first node N1. The first capacitor C1 may change a voltage of the first node N1, corresponding to a voltage supplied from the jth data line DLj through the third transistor M3. The first capacitor C1 will be described in detail later with reference to FIG. 6.

Figure 4:
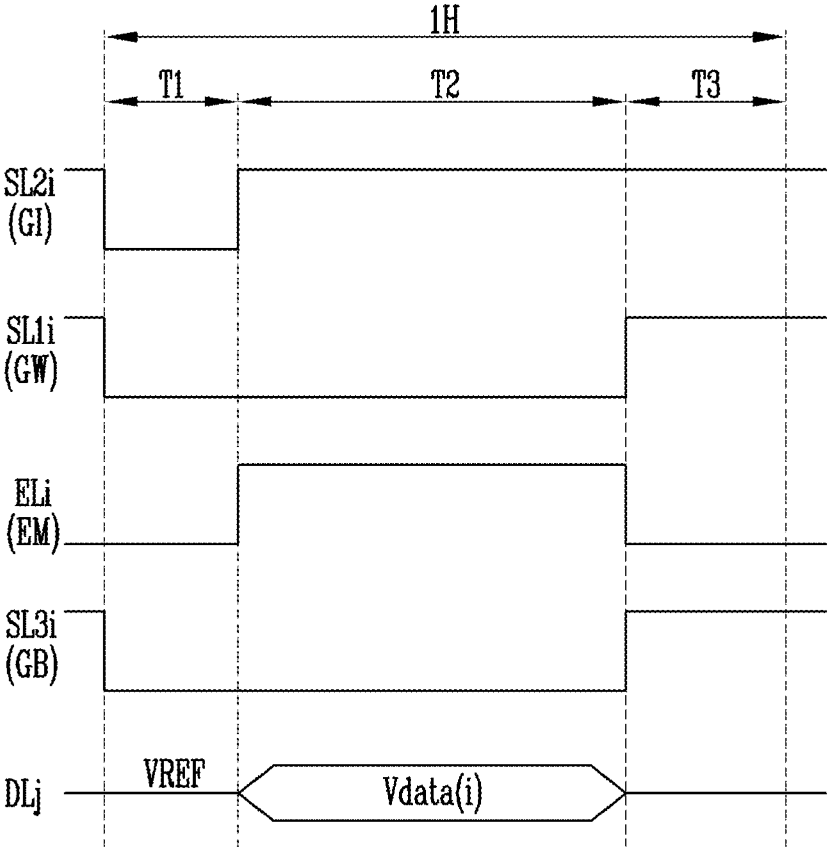
FIG. 4 is a timing diagram illustrating an embodiment of a driving method of the pixel shown in FIG. 3.

FIG. 4 is a timing diagram illustrating an embodiment of a driving method of the pixel shown in FIG. 3.

Referring to FIGS. 3 and 4, the pixel PXij may be supplied with a data signal in a horizontal period 1H (or specific horizontal period). The horizontal period 1H may be divided into a first period T1, a second period T2, and a third period T3, which are sequentially defined.

The first scan driver 131 may supply the first scan signal GW having the gate-on voltage to the ith first scan line SL1*i* in the first and second periods T1 and T2.

The second scan driver 132 may supply the second scan signal GI having the gate-on voltage to the ith second scan line SL2*i* in the first period T1. In embodiments, the first period T1 may overlap with a predetermined horizontal period (e.g., a period in which a data signal is supplied to pixels located on an (i−1)-th horizontal line).

The third scan driver 133 may supply the third scan signal GB having the gate-on voltage to the ith third scan line SL3*i* in the first and second periods T1 and T2. In embodiments, the third period T3 may overlap with a next horizontal period (e.g., a period in which a data signal is supplied to pixels located on an (i+1)-th horizontal line).

The emission driver 150 (see FIG. 1) may apply the emission control signal EM having the gate-on voltage to the ith emission control line ELi in the first period T1 and the third period T3. In other words, the emission driver 150 may disable the emission control signal EM to the gate-off voltage in the second period T2.

The data driver 140 (see FIG. 1) may supply a voltage Vdata (i) of the data signal to the jth data line DLj in the second period T2. The voltage Vdata (i) of the data signal may be set as a predetermined voltage within a voltage range of the data signal, corresponding to a grayscale.

The data driver 140 may supply a reference power source VREF to the jth data line DLj in the first and third periods T1 and T3. The reference power source VREF is a voltage between the first driving power source VDD and the second driving power source VSS, and may be set to a specific voltage within the voltage range of the data signal.

In some embodiments, the first period T1 may be an initialization period. In an example, in the first period T1, a voltage of the reference power source VREF may be supplied to the jth data line DLj. In the first period T1, the voltage of the reference power source VREF may be supplied to the first node N1 included in the pixel PXij, and the voltage of the initialization power source VINT may be may be supplied to the third node N3 included in the pixel PXij. In the first period T1, the first node N1 may be initialized by the voltage of the reference power source VREF, and the third node N3 may be initialized by the voltage of the initialization power source VINT.

The second period T2 may be a data programming period. In an example, the second period T2 may be a period in which the voltage Vdata (i) of the data signal from the jth data line DLj is supplied to the pixel PXij. In the second period T2, a voltage corresponding to the data signal may be supplied to the first node N1.

The third period T3 may be an emission period. In an example, in the third period T3, a driving current may be supplied from the first driving power source VDD to the light emitting element LD through the fifth transistor M5, the second transistor M2, and the first transistor M1. In the third period T3, the first transistor M1 may control an amount of current flowing from the first driving power source VDD to the second driving power source VSS via the fifth transistor M5, the second transistor M2, and the light emitting element LD according to the voltage of the first node N1. In the third period T3, the light emitting element LD may emit light with a luminance corresponding to the amount of current.

Although not shown in FIG. 4, in transition periods between the first to third periods T1 to T3, timings at which the first scan signal GW, the second scan signal GI, the third scan signal GB, the emission control signal EM, and the data signal are output (or transferred) may be controlled not to overlap with each other.

FIGS. 5A to 7B are diagrams illustrating operations of the pixel in the periods shown in FIG. 4.

Figure 5A:
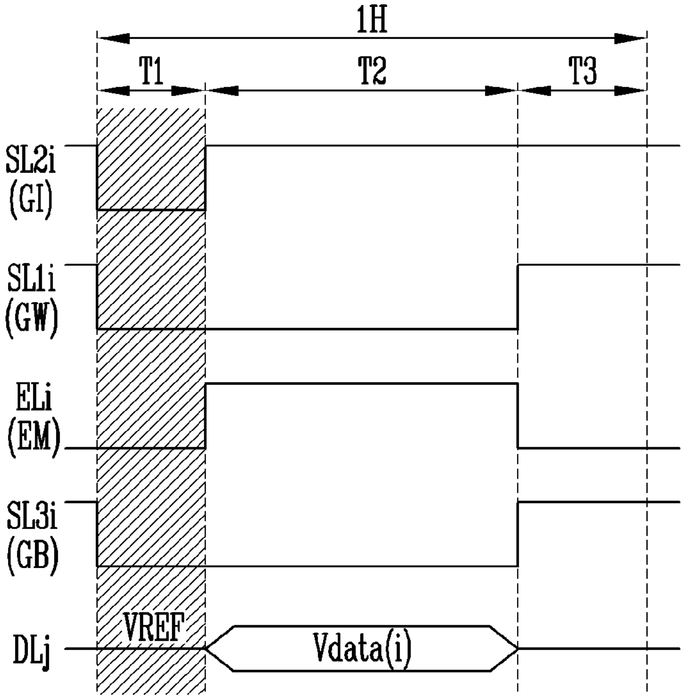
FIGS. 5A to 7B are diagrams illustrating operations of the pixel in periods shown in FIG. 4.
Figure 5B:
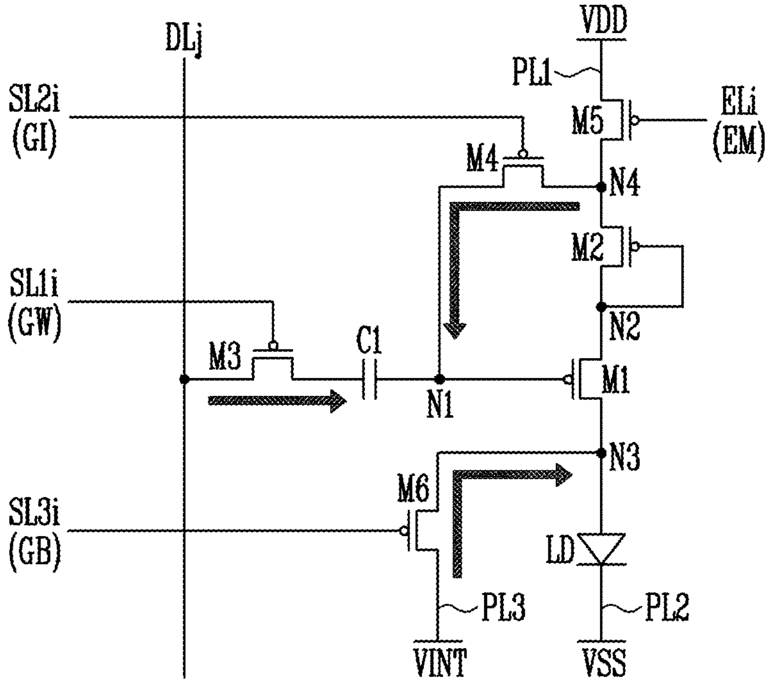

Referring to FIGS. 5A and 5B, in the first period T1, the third to sixth transistors M3 to M6 may be turned on.

In the first period T1, the emission control signal EM may be supplied to the ith emission control line ELi. When the emission control signal EM is supplied to the ith emission control line ELi, the fifth transistor M5 may be turned on. When the fifth transistor M5 is turned on, the first power line PL1 to which the first driving power source VDD is supplied may be electrically connected to the fourth node N4.

In the first period T1, the third scan signal GB may be supplied to the third scan line SL3*i*. When the third scan signal GB is supplied to the third scan line SL3*i*, the sixth transistor M6 may be turned on. When the sixth transistor M6 is turned on, the voltage of the initialization power source VINT may be supplied to the third node N3. The anode electrode of the light emitting element LD may be initialized by the voltage of the initialization power source VINT. The initialization power source VINT may be set to a voltage at which the light emitting element LD does not emit light, and accordingly, the light emitting element LD may be set to be in a non-emission state.

In the first period T1, the first scan signal GW may be supplied to the first scan line SL1*i*. When the first scan signal GW is supplied to the first scan line SL1*i*, the third transistor M3 may be turned on, and accordingly, the voltage of the reference power source VREF from the jth data line DLj may be supplied to the first node N1. The voltage of the first node N1 may be initialized to the voltage of the reference power source VREF regardless of a voltage supplied in a previous period (or previous frame period). In addition, when the third transistor M3 is turned on, the voltage of the reference power source VREF from the jth data line DLj may be supplied to the first electrode of the first capacitor C1.

In the first period T1, when the second scan signal GI is supplied to the second scan line SL2*i*, the fourth transistor M4 may be turned on. As described above, since the fifth transistor M5 is turned on in the first period T1, the voltage of the first driving power source VDD may be applied to the first node N1.

As such, in the first period T1, a voltage corresponding to a voltage difference between the reference power source VREF and the first node N1 may be stored in the first capacitor C1. Also, in the first period T1, the voltage of the initialization power source VINT may be applied to the third node N3 through the sixth transistor M6.

Figure 6A:
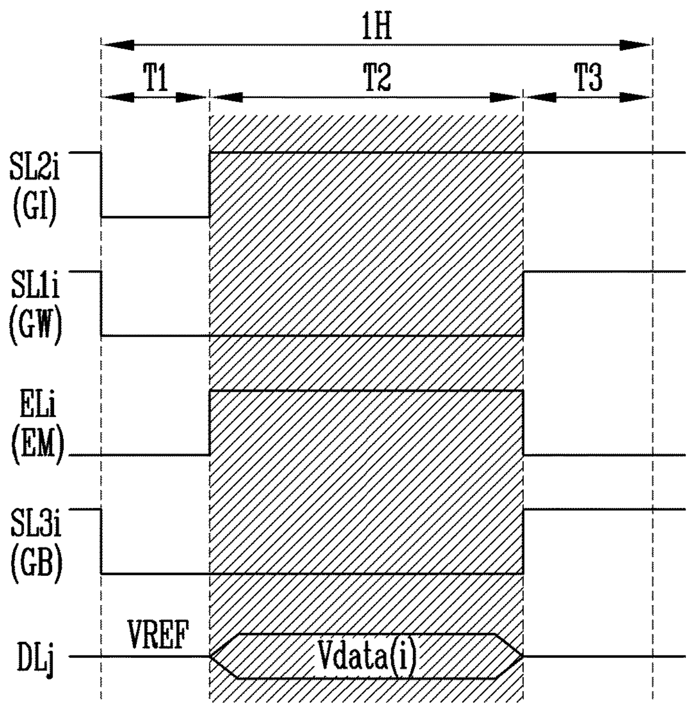
Figure 6B:
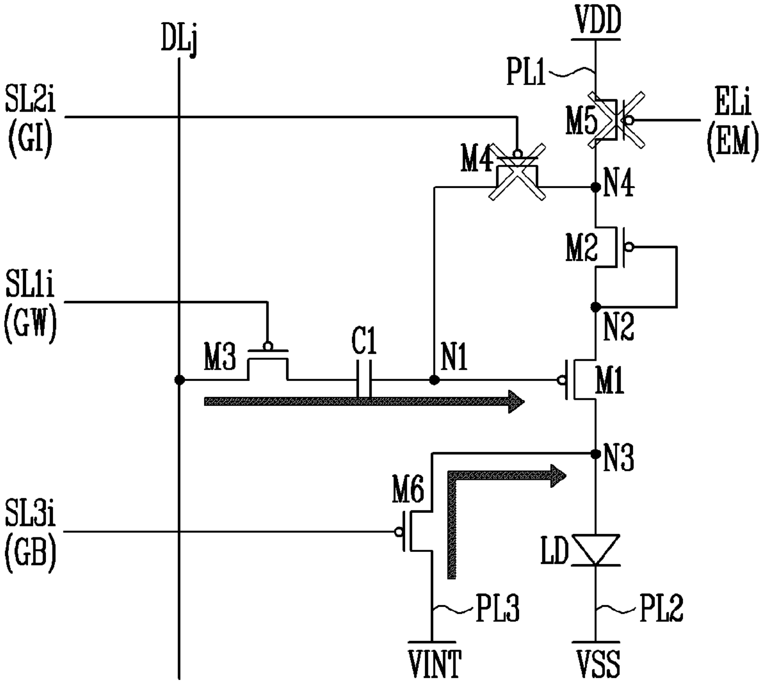

Referring to FIGS. 6A and 6B, in the second period T1, the fourth transistor M4 and the fifth transistor M5 may be turned off, and the third transistor M3 and the sixth transistor M6 may maintain the turn-on state.

In the second period T2, as the supply of the first emission control signal EM to the emission control line ELi is suspended, the fifth transistor M5 may be turned off.

In the second period T2, the turn-on state of the third transistor M3 may be maintained by the first scan signal GW supplied to the first scan line SL1*i*, and the turn-on state of the sixth transistor M6 may be maintained by the third scan signal GB supplied to the third scan line SL3*i*.

In the second period T2, as the supply of the second scan signal GI to the second scan line SL2*i* is suspended, the fourth transistor M4 may be turned off.

In the second period T2, the voltage Vdata (i) of the data signal may be supplied to the data line DLj. The voltage Vdata (i) of the data signal, which is supplied to the data line DLj, may be supplied to the first electrode of the first capacitor C1 via the third transistor M3.

When the voltage Vdata (i) of the data signal is supplied to the first electrode of the first capacitor C1, the first electrode of the first capacitor C1 may be changed from the voltage of the reference power source VREF to the voltage Vdata (i) of the data signal. The voltage of the first node N1 may also be changed by coupling of the first capacitor C1.

A voltage change value of the first node N1 may be determined according to a capacitance of the first capacitor C1. The voltage Vdata (i) of the data signal may be supplied to the first node N1 through the first capacitor C1. Due to a charge distribution effect of the first capacitor C1 and a second capacitor C2, the voltage range of the data signal may be set wider as the capacitance of the first capacitor C1 becomes smaller. Alternatively, the voltage range of the data signal may be set wider as the magnitude of a capacitance of the second capacitor C2 becomes larger.

As such, the voltage Vdata (i) of the data signal is transferred to the gate electrode of the first transistor M1 through the first capacitor C1, so that the voltage range of the data signal can be set sufficiently wide. Thus, in accordance with the embodiment of the present disclosure, various grayscales can be readily implemented using a wider voltage range of the data signal.

Figure 7A:
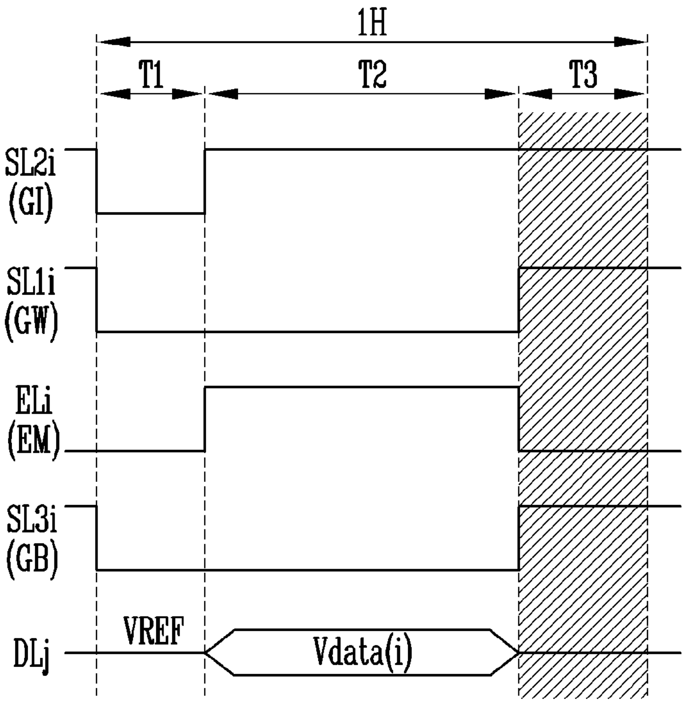
Figure 7B:
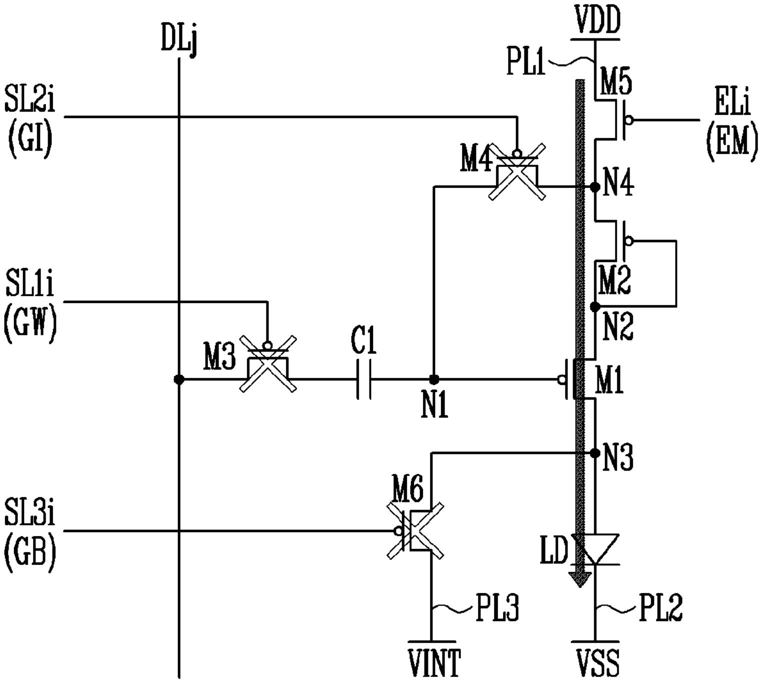

Referring to FIGS. 7A and 7B, in the third period T3, the third transistor M3, the fourth transistor M4, and the sixth transistor M6 may be turned off, and the fifth transistor M5 may be turned on.

In the third period T3, as the first emission control signal EM is supplied to the emission control line ELi, the fifth transistor M5 may be turned on. On the other hand, as the supply of the third scan signal GB to the third scan line SL3*i* is suspended, the sixth transistor M6 may be turned off.

The first transistor M1 may control an amount of driving current supplied from the first driving power source VDD to the second driving power source VSS via the fifth transistor M5, the second transistor M2, and the light emitting element LD, corresponding to the voltage of the first node N1. In the third period T3, the light emitting element LD may generate light with a luminance corresponding to the amount of driving current supplied from the first transistor M1.

Specifically, an amount of current supplied from the first transistor M1 to the light emitting element LD in the third period T3 may be determined as shown in Equation 3.

Equation 3

$$I_d = \frac{1}{2}\mu_p C_{ox}\frac{W}{L}\left(\frac{VDD - V_{dsat2} - |V_{th2}| - \frac{C_1}{C_1 + C_2}(V_{data} - VREF)}{1 + g_{m1}R_{dio}} - |V_{th1}|\right)^2$$

Up may denote an electric field mobility, $C_{ox}$ may denote a capacity of a gate insulating layer per unit area, and W/L may denote a width/length ratio of a channel of the first transistor M1, $I_d$ may denote a current supplied to the light emitting element LD, VDD may denote the voltage of the first driving power source VDD, $V_{th1}$ may denote a threshold voltage of the first transistor M1, $V_{th2}$ may denote a threshold voltage of the second transistor M2, and $V_{dsta2}$ may denote a saturation voltage of the second transistor M2. Vdata may denote the voltage of the data signal input to the gate electrode of the first transistor M1, and VREF may denote the voltage of the reference power source.

$C_1$ may denote a capacitance of the first capacitor C1, and $C_2$ may denote, as the second capacitor C2 (see FIG. 8), a capacitance of a parasitic capacitor between the first node N1 and the second node N2 of the first transistor M1. Alternatively, as shown in FIG. 8, C2 may denote a capacitance of an auxiliary capacitor.

As such, the amount of current supplied from the first transistor M1 to the light emitting element LD may be a value obtained by compensating for the threshold voltage of the first transistor M1 and a threshold voltage of the light emitting element LD.

Figure 8:
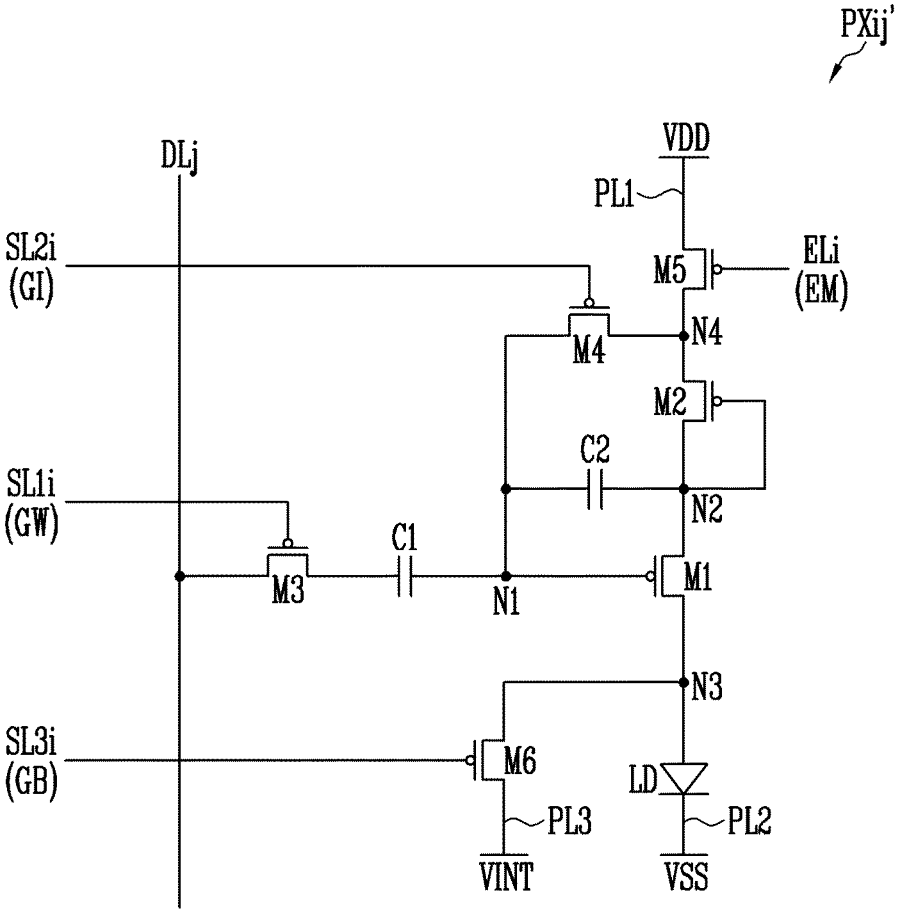
FIG. 8 is a circuit diagram illustrating another embodiment of the one of the pixels shown in FIG. 1.

FIG. 8 is a circuit diagram illustrating another embodiment of the one of the pixels shown in FIG. 1.

Referring to FIGS. 3 and 8, a pixel PXij' may be substantially identical to the pixel PXij shown in FIG. 3 except a second capacitor C2. In FIG. 8, overlapping descriptions related to FIG. 3 will be omitted, and portions different from those of the above-described embodiment will be mainly described.

The second capacitor C2 may be connected between the first node N1 and the second node N2. A first electrode of the second capacitor C2 may be electrically connected to a gate electrode of the first transistor M1, and a second electrode of the second capacitor C2 may be electrically connected to the first electrode (or source electrode) of the first transistor M1. The second capacitor C2 may store a voltage provided between the first node N1 and the second node N2.

In addition, when the voltage Vdata (i) of the data signal is supplied to the first electrode of the first capacitor C1 in the second period T2, the first electrode of the first capacitor C1 may be changed from the voltage of the reference power source VREF to the voltage Vdata (i) of the data signal. In addition, the voltage change value of the first node N1 may be determined according to a capacitance ratio between the first capacitor C1 and the second capacitor C2.

In an example, the voltage change value of the first node N1 may be determined according to a value obtained by multiplying a voltage change value of the first electrode of the first capacitor C1 by C1/(C1+C2). A capacitance of the second capacitor C2 may be smaller than the capacitance of the first capacitor C1. As such, the second capacitor C2 is connected between the first node N1 and the second node N2, so that the voltage range of the data signal can be set more accurately or adaptively in some embodiments.

Figure 9:
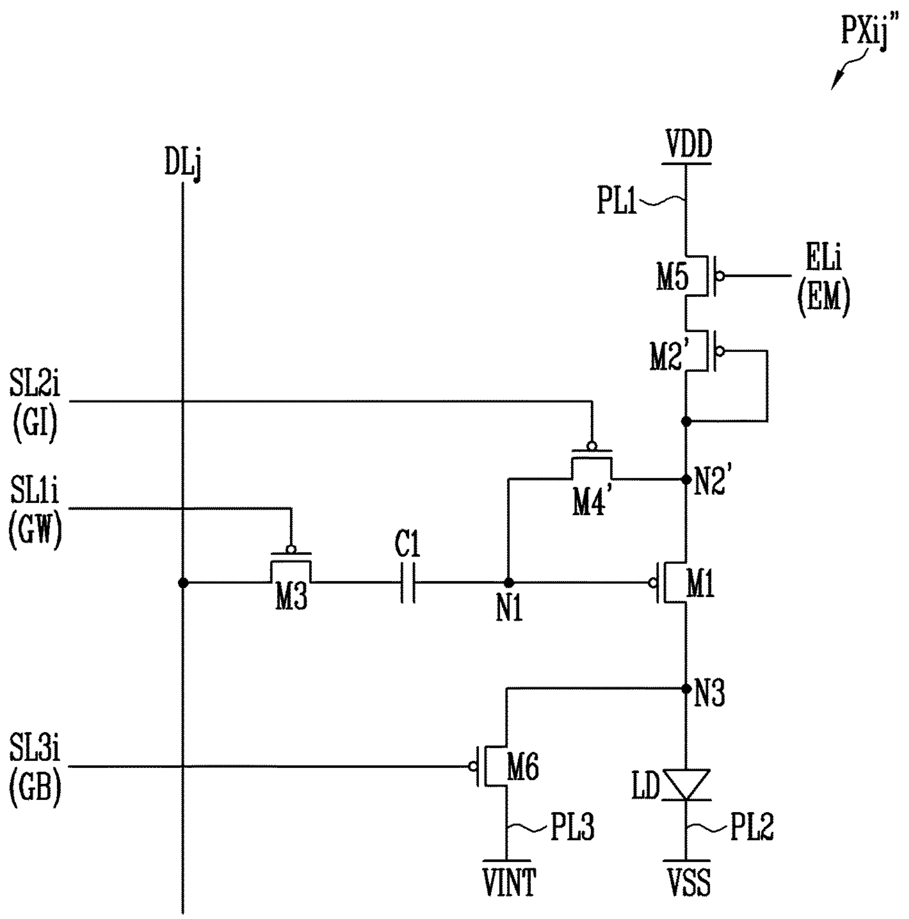
FIG. 9 is a circuit diagram illustrating still another embodiment of the one of the pixels shown in FIG. 1.

FIG. 9 is a circuit diagram illustrating still another embodiment of the one of the pixels shown in FIG. 1.

Referring to FIG. 9, a pixel PXij" may include a first transistor M1, a third transistor M3, a fifth transistor M5, a sixth transistor M6, and a light emitting element LD.

The first transistor M1, the third transistor M3, the fifth transistor M5, the sixth transistor M6, and the light emitting element LD may be substantially identical to those of the pixel PXij shown in FIG. 3. In FIG. 9, overlapping descriptions related to FIG. 3 will be omitted, and portions different from those of the above-described embodiment will be mainly described.

Referring to FIG. 9, the pixel PXij" may be connected to corresponding signal lines SL1*i*, SL2*i*, SL3*i*, ELi, and DLj. In an embodiment, for example, the pixel PXij" may be connected to an ith first scan line SL1*i*, an ith second scan line SL2*i*, an ith third scan line SL3*i*, an emission control line ELi, and a jth data line DLj. In an embodiment, the pixel PXij" may be further connected to the first power line PL1, the second power line PL2, and the third power line PL3.

The pixel PXij" may include the light emitting element LD and a pixel circuit for controlling an amount of current supplied to the light emitting element LD.

A fourth transistor M4' may be connected between a first node N1 and a second node N2'. In addition, a gate electrode of the fourth transistor M4' may be electrically connected to the ith second scan line SL2*i*. The fourth transistor M4' may be turned on when a second scan signal GI is supplied to the ith second scan line SL2*i*, to electrically connect the first node N1 and the second node N2' to each other. A gate electrode of the first transistor M1 may be electrically connected to the second node N2'. Accordingly, the first transistor M1 may function as a diode according to an operation of the fourth transistor M4'.

A second transistor M2' may be connected between the fifth transistor M5 and the second node N2'. In addition, a gate electrode of the second transistor M2' may be electrically connected to the second node N2'. The second transistor M2' may function as a diode such that a current flowing from the first power line PL1 through the fifth transistor M5 flows through the second node N2'. In an embodiment, for example, the gate electrode of the second transistor M2' may be electrically connected to a drain electrode thereof, to function as the diode.

An operation process of the fourth transistor M4' in the horizontal period (1H) may be substantially identical to the operation process of the fourth transistor M4 shown in FIG. 3 in the horizontal period, except that the fourth transistor M4' is connected to the second node N2'.

Figure 10:
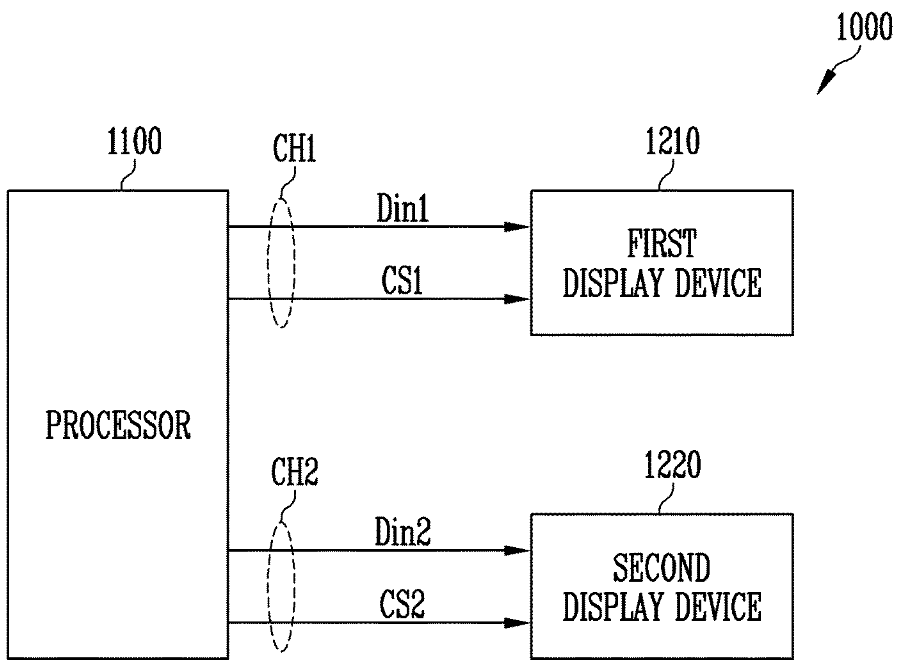
FIG. 10 is a block diagram illustrating an embodiment of a display system including the display device shown in FIG. 1.

FIG. 10 is a block diagram illustrating an embodiment of a display system including the display device shown in FIG. 1.

Referring to FIG. 10, a display system 1000 may include a processor 1100 and one or more display devices 1210 and 1220.

The processor 1100 may perform various tasks and various calculations. In embodiments, the processor 1100 may include an Application Processor (AP), a Graphics Processing Unit (GPU), a microprocessor, a Central Processing Unit (CPU), and/or the like. The processor 1100 may be connected to other components of the display system 1000 through a bus system to control the components of the display system 1000.

In FIG. 10, it is illustrated that the display system 1000 includes first and second display devices 1210 and 1220. The processor 1100 may be connected to the first display device 1210 through a first channel CH1, and be connected to the second display device 1220 through a second channel CH2.

Through the first channel CH1, the processor 1100 may transmit first input data Din1 and a first control signal CS1 to the first display device 1210. The first display device 1210 may display an image, based on the first input data Din1 and the first control signal CS1. The first display device 1210 may be configured identically to the display device 100 described with reference to FIG. 1. The first input data Din1 and the first control signal CS1 may be provided as the input data Din and the control signal CS, which are shown in FIG. 1, respectively.

Through the second channel CH2, the processor 1100 may transmit second input data Din2 and a second control signal CS2 to the second display device 1220. The second display device 1220 may display an image, based on the second input data Din2 and the second control signal CS2. The second display device 1220 may be configured identically to the display device 100 described with reference to FIG. 1. The second input data Din2 and the second control signal CS2 may be provided as the input data Din and the control signal CS, which are shown in FIG. 1, respectively.

The display system 1000 may include a computing system for providing an image display function, such as a portable computer, a mobile phone, a smartphone, a tablet personal computer ("PC"), a smart watch, a watch phone, a portable multimedia player ("PMP"), a navigation system, or an ultra mobile computer ("UMPC"). Also, the display system 1000 may include at least one of a head mounted display (HMD) device, a virtual reality (VR) device, a mixed reality ("MR") device, or an augmented reality (AR) device.

Figure 11:
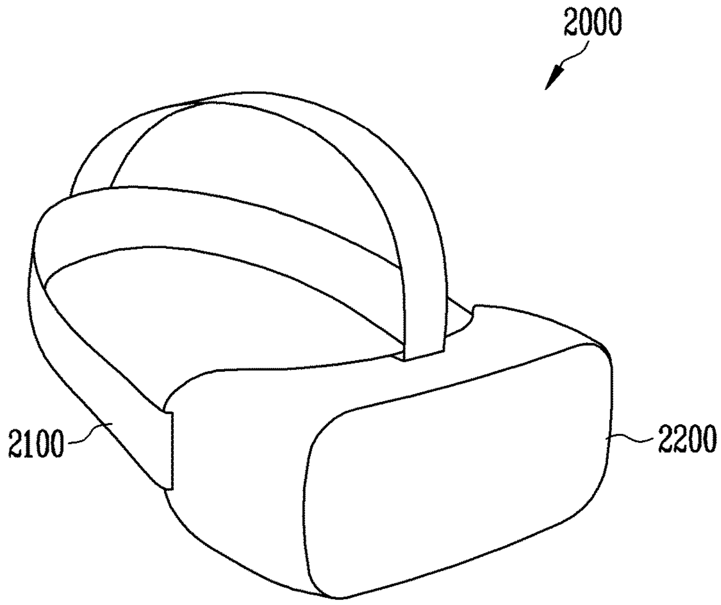
FIG. 11 is a perspective view illustrating an application example of the display system shown in FIG. 10.

FIG. 11 is a perspective view illustrating an application example of the display system shown in FIG. 10.

Referring to FIG. 11, the display system 1000 shown in FIG. 10 may be applied to a head mounted display device 2000. The head mounted display device 2000 may be a wearable electronic device which can be worn on a head of a user.

The head mounted display device 2000 may include a head mounting band 2100 and a display device accommodating case 2200. The head mounting band 2100 may be connected to the display device accommodating case 2200. The head mounting band 2100 may include a horizontal band and/or a vertical band, used to fix the head mounted display device 2000 to the head of the user. The horizontal band may be configured to surround a side portion of the head of the user, and the vertical band may be configured to surround an upper portion of the head of the user. However, embodiments are not limited thereto. For another example, the head mounting band 2100 may be implemented in the form of a glasses frame, a helmet or the like.

The display device accommodating case 2200 may accommodate the first and second display devices 1210 and 1220 shown in FIG. 10. The display device accommodating case 2200 may further accommodate the processor 1100 shown in FIG. 10.

In the pixel and the display device including the same in accordance with the embodiments of the present disclosure, the second transistor M2 serving as a diode is connected to the first electrode of the first transistor M1, so that the threshold voltage distribution of the first transistor M1 can be compensated through source degradation. Thus, the first transistor M1 can have a wide voltage range of a data signal as compared with characteristics thereof. In addition, a voltage of the data signal is transferred to the gate electrode of the first transistor M1 through the first capacitor C1, so that the voltage range of the data signal can be further widened. As such, in accordance with the embodiments of the present disclosure, various grayscales can be readily implemented using a wider voltage range of the data signal.

In accordance with the present disclosure, there can be provided a pixel having improved efficiency and a display device including the pixel.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A pixel comprising:

a first transistor having a gate electrode connected to a first node, the first transistor being connected between a second node and a third node;

a second transistor connected between the second node and a first power line to which a first driving power source is supplied, the second transistor having a gate electrode connected to the second node;

a third transistor connected between a data line and the first node, the third transistor having a gate electrode electrically connected to a first scan line;

a first capacitor connected between the first node and the third transistor;

a light emitting element connected between the third node and a second power line to which a second driving power source is supplied;

a fourth transistor connected between a fourth node and the first node, the fourth transistor having a gate electrode electrically connected to a second scan line; and a fifth transistor connected between the first power line and the fourth node, the fifth transistor having a gate electrode electrically connected to an emission control line, wherein the second transistor is connected between the fourth node and the second node.

2. The pixel of claim 1, further comprising a sixth transistor connected between the third node and a third power line, the sixth transistor having a gate electrode electrically connected to a third scan line.

3. The pixel of claim 2, wherein each of the first transistor, the third transistor, and the sixth transistor has a first breakdown voltage, and at least one of the second transistor, the fourth transistor, or the fifth transistor has a second breakdown voltage, wherein the second breakdown voltage is lower than the first breakdown voltage.

4. The pixel of claim 2, wherein one horizontal period includes a first period, a second period, and a third period, which are sequentially defined, and wherein, in the first period, the third and sixth transistors are turned on.

5. The pixel of claim 4, wherein, in the second period, the fourth and fifth transistors are turned off, and the third and sixth transistors are continuously turned on.

6. The pixel of claim 5, wherein, in the second period, a data voltage supplied to the data line is transferred to the first capacitor and the gate electrode of the first transistor through the turned-on third transistor.

7. The pixel of claim 4, wherein, in the third period, the third transistor, the fourth transistor, and the sixth transistor are turned off, and the fifth transistor is turned on.

8. The pixel of claim 7, wherein, in the third period, a driving current is supplied to the light emitting element from the first power line through the fifth transistor, the second transistor, and the first transistor according to a voltage of the gate electrode of the first transistor.

9. The pixel of claim 2, wherein each of the first to sixth transistors is a P-type transistor.

10. The pixel of claim 1, further comprising a second capacitor connected between the first node and the second node.

11. The pixel of claim 1, wherein the second transistor functions as a diode such that a current flows from the first power line to the second node.

12. The pixel of claim 1, comprising:

a fourth transistor connected between a fourth node and the first node, the fourth transistor having a gate electrode connected to a second scan line; and a fifth transistor connected between the first power line and the fourth node, the fifth transistor having a gate electrode electrically connected to an emission control line, wherein the second transistor is connected between the fifth transistor and the second node.

13. The pixel of claim 12, further comprising a sixth transistor connected between the third node and a third power line, the sixth transistor having a gate electrode electrically connected to a third scan line.

14. A display device comprising:

pixels connected first scan lines, second scan lines, third scan lines, data lines, and emission control lines, wherein any one pixel among the pixels includes:

a first transistor having a gate electrode connected to a first node, the first transistor being connected between a second node and a third node;

a second transistor connected between the second node and a first power line to which a first driving power source is supplied, the second transistor having a gate electrode connected to the second node;

a third transistor connected between the first node and one of the data lines, the third transistor having a gate electrode electrically connected to one of the first scan lines;

a first capacitor connected between the first node and the third transistor;

a light emitting element connected between the third node and a second power line to which a second driving power source is supplied;

a fourth transistor connected between a fourth node and the first node, the fourth transistor having a gate electrode electrically connected to one of the second scan lines; and a fifth transistor connected between the first power line and the fourth node, the fifth transistor having a gate electrode electrically connected to one of the emission control lines, wherein the second transistor is connected between the fourth node and the second node.

15. The display device of claim 14, further comprising:

a fourth transistor connected between a fourth node and the first node, the fourth transistor having a gate electrode connected to one of the second scan lines; and a fifth transistor connected between the first power line and the fourth node, the fifth transistor having a gate electrode electrically connected to one of the emission control lines, wherein the second transistor is connected between the fifth transistor and the second node.

16. The display device of claim 14, further comprising a sixth transistor connected between the third node and a third power line, the sixth transistor having a gate electrode electrically connected to one of the third scan lines.

17. The display device of claim 14, further comprising a second capacitor connected between the first node and the second node.

* * * * *